United States Patent
Sakata et al.

(10) Patent No.: US 7,958,318 B2
(45) Date of Patent: Jun. 7, 2011

(54) COHERENCY MAINTAINING DEVICE AND COHERENCY MAINTAINING METHOD

(75) Inventors: Hideki Sakata, Kawasaki (JP); Hiroyuki Kojima, Kawasaki (JP); Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 424 days.

(21) Appl. No.: 12/222,726

(22) Filed: Aug. 14, 2008

(65) Prior Publication Data

US 2008/0313405 A1 Dec. 18, 2008

Related U.S. Application Data

(63) Continuation of application No. PCT/JP2006/302533, filed on Feb. 14, 2006.

(51) Int. Cl.
G06F 12/00 (2006.01)
(52) U.S. Cl. .......................... 711/141; 711/119
(58) Field of Classification Search .................. 711/119, 711/141
See application file for complete search history.

(56) References Cited

U.S. PATENT DOCUMENTS

| | | |
|---|---|---|
| 5,694,573 A | 12/1997 | Cheong et al. |
| 5,796,980 A | 8/1998 | Bowles |
| 6,115,794 A | 9/2000 | Arimilli et al. |
| 7,428,617 B2 | 9/2008 | Okawa et al. |
| 2002/0010836 A1 | 1/2002 | Barroso et al. |
| 2003/0208658 A1 | 11/2003 | Magoshi |

FOREIGN PATENT DOCUMENTS

| | | |
|---|---|---|
| EP | 0 549 219 A1 | 6/1993 |
| EP | 1 622 028 A2 | 2/2006 |
| GB | 2 223 868 | 4/1990 |
| JP | 02-090259 | 3/1990 |
| JP | 05-342101 | 12/1993 |
| JP | 06-035801 | 2/1994 |
| JP | 07-295883 | 11/1995 |
| JP | 08-235061 | 9/1996 |
| JP | 10-301850 | 11/1998 |
| JP | 2004-533079 | 10/2004 |
| JP | 2006-040175 | 2/2006 |
| WO | 03/001369 | 1/2003 |

OTHER PUBLICATIONS

Japanese Office Action issued on Nov. 25, 2008 in corresponding Japanese Patent Application No. 2008-500363.
International Search Report of International Published Application No. PCT/JP2006/302533 (mailed Jul. 25, 2006).
European Search Report mailed Jul. 10, 2009 and issued in corresponding European Patent Application 06713674.7.

*Primary Examiner* — Jack A Lane
(74) *Attorney, Agent, or Firm* — Staas & Halsey LLP

(57) ABSTRACT

A second-level cache device stores part of registration information of data for a first-level cache device in a second-level cache-tag unit in association with registration information in a second-level-cache data unit, and stores the registration information of data for the first-level cache device in a first-level cache-tag copying unit. A coherency maintaining processor maintains coherency between the first-level cache device and the second-level cache device based on the information stored in the second-level cache-tag unit and the first-level cache-tag copying unit.

12 Claims, 16 Drawing Sheets

FIG.9

| CODE | MEANING |
|---|---|
| 0000 | INVALID |
| 0001 | SHARED BY PLURALITY OF CORES |
| 0010 | REGISTERED IN OPERAND WAY 0 IN UPDATE VERSION |
| 0011 | REGISTERED IN OPERAND WAY 1 IN UPDATE VERSION |
| 01-- | INVALID (RESERVE) |
| 1000 | REGISTERED IN COMMAND WAY 0 IN SHARED VERSION |
| 1001 | REGISTERED IN COMMAND WAY 1 IN SHARED VERSION |
| 1010 | REGISTERED IN OPERAND WAY 0 IN SHARED VERSION |
| 1011 | REGISTERED IN OPERAND WAY 1 IN SHARED VERSION |
| 1100 | REGISTERED IN COMMAND WAY 0/OPERAND WAY 0 IN SHARED VERSION |
| 1101 | REGISTERED IN COMMAND WAY 0/OPERAND WAY 1 IN SHARED VERSION |
| 1110 | REGISTERED IN COMMAND WAY 1/OPERAND WAY 0 IN SHARED VERSION |
| 1111 | REGISTERED IN COMMAND WAY 1/OPERAND WAY 1 IN SHARED VERSION |

FIG.10

FIRST-CACHE DETAILED INFORMATION

| SECOND-LEVEL CACHE ADDRESS | SECOND CACHE WAY | STATUS |
|---|---|---|
| 600 | 601 | 602 |

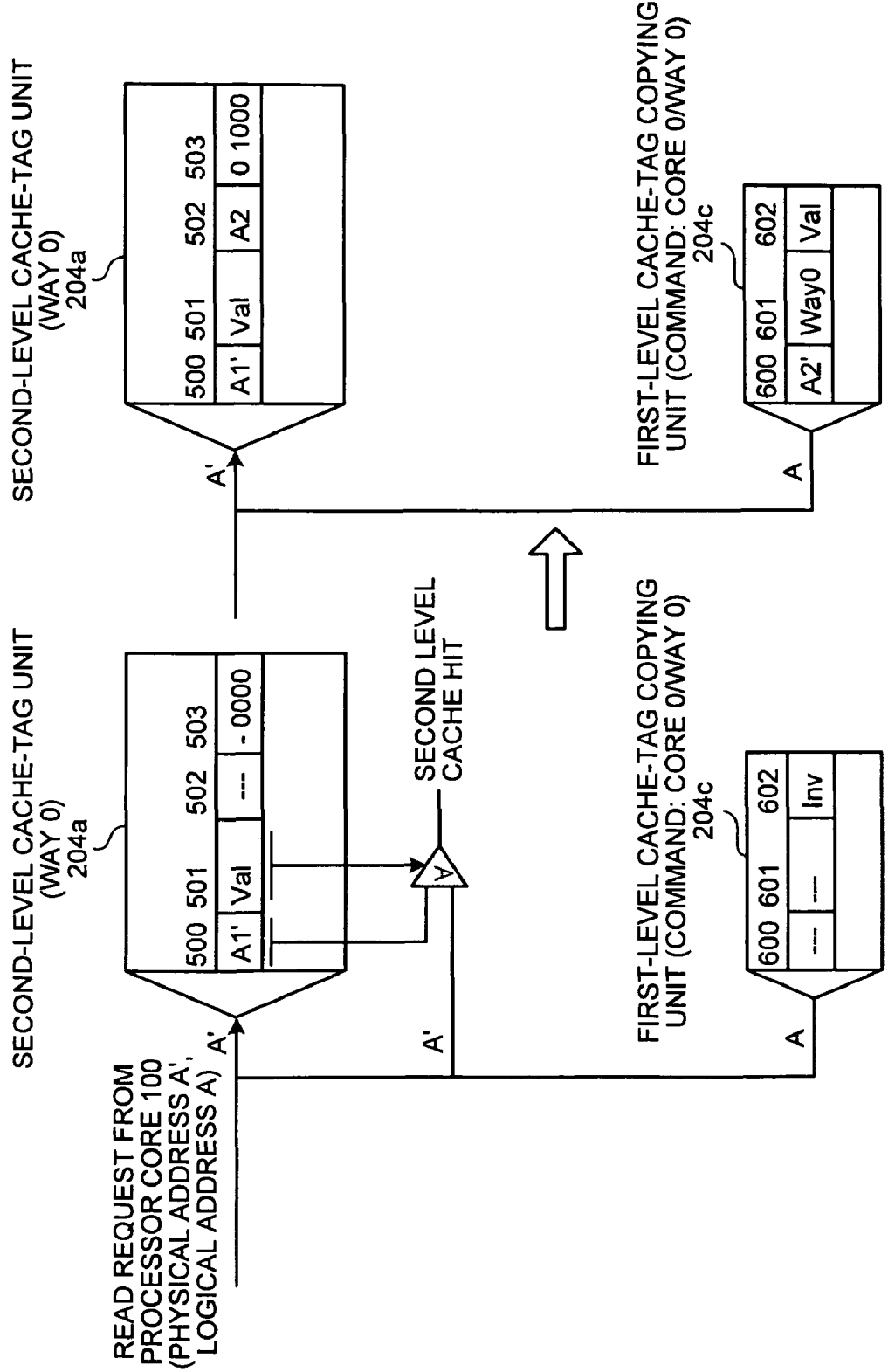

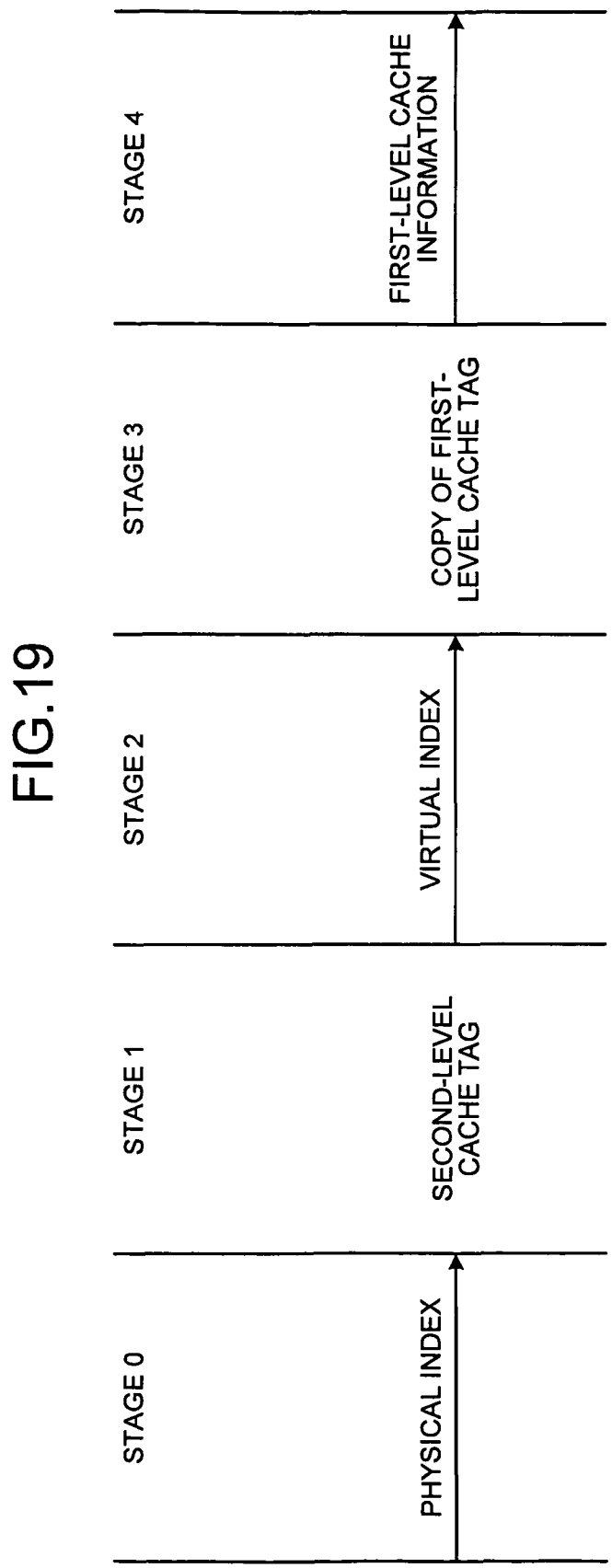

COHERENCY MAINTAINING DEVICE AND COHERENCY MAINTAINING METHOD

CROSS REFERENCE TO RELATED APPLICATION

This application is a Continuation Application based on PCT Application No. PCT/JP2006/302533 filed Feb. 14, 2006, the disclosure of which is incorporated by reference in its entirety into this application.

BACKGROUND OF THE INVENTION

1. Field of the Invention

The present invention relates to a technology for maintaining coherency between cache memories.

2. Description of the Related Art

A central processing unit (CPU) uses a cache memory as a solution to data delay problems, which occurs among main memories. The cache memory has a hierarchical structure with respect to the main memories, and ones having a plurality of hierarchies have been currently used.

The cache memory is referred to as a first level cache and a second level cache in order of being closer to a CPU. Generally, the cache memory is configured such that as the cache memory is closer to the CPU, it has a smaller capacity, although access becomes faster, and as the cache memory is closer to the main memory, it has a larger capacity, although access becomes slower.

In the conventional cache memory, a copy of a tag with respect to the first level cache is stored in the second level cache, and the second level cache uses the copy of the first-level cache tag to obtain tag information of the first level cache, thereby eliminating mutual inconsistency between the first level cache and the second level cache (maintain the coherency).

FIG. 19 is a diagram showing stages until a state of a first level cache is obtained according to a conventional technology. As shown in FIG. 19, in the conventional technology, the mutual inconsistency between the first level cache and the second level cache is eliminated in such a manner that when a second-level cache tag is accessed by a physical index, the copy of the first-level cache tag is accessed by using a virtual index included in the second level cache (that is, two-step access) to ascertain a registration state of the first level cache.

Japanese Patent Application Laid-open No. H10-301850 discloses a technology to improve decoding efficiency in a cache-line state by associating a state bit field with each cache line included in the cache. Japanese Patent Application Laid-open No. H8-235061 discloses a technology enabling to track inclusion of a data cache by involving a directory having an inclusion bit, a command bit, and a data bit in a common second level cache.

Japanese Patent Application No. 2004-222401 discloses a technology in which the copy of the first-level cache tag can be searched, using a search result of the tag to the second level cache, by integrating the copy of the first-level cache tag with the second level cache, thereby enabling to eliminate a delay due to two-step access.

In this conventional technology, however, while the two-step access can be eliminated to enable speed-up of the machine cycle of the cache memory, there is a problem in that use efficiency relating to the copy of the first-level cache tag integrated with the second level cache is low, because of the hierarchical structure of the cache memory, and limited resources of the second level cache cannot be efficiently used.

This is attributable to a large capacity of the second level cache as compared with the capacity of the first level cache, that is, to a difference in the number of entries between the first and second level caches. If it is tried to include the first-level cache tag in the tag to the second level cache, fundamentally, there is a portion that is never used by the capacity difference therebetween. For example, if it is assumed that the second level cache has 96 k entries, whereas the first level cache has 2 k entries, the copy portion of the first-level cache tag used in the second level cache has a use efficiency of 2% at maximum.

Further, due to the improvement of recent semiconductor technologies, the latest CPUs include multicores. The second level cache accessed from the multicores has a smaller difference in the number of entries than that at the time of including a single core. However, because an amount of information required for the copy of the first level cache increases, as a result, the use efficiency of the integrated tag decreases, and this problem becomes more serious.

Further, to improve the use efficiency, the above conventional technologies can be used. In the conventional technologies, however, two-step access needs to be performed to ascertain the registration state of the first level cache. Therefore, a delay problem due to the two-step access occurs, and it is difficult to speed up the machine cycle.

That is, it is an important to improve the machine cycle by eliminating the delay due to the two-step access, and to efficiently use the limited resources of the cache memory.

SUMMARY

It is an object of the present invention to at least partially solve the problems in the conventional technology.

According to an aspect of the present invention, a coherency maintaining device maintains coherency between a first cache memory and a second cache memory that stores data in the first cache memory. The coherency maintaining device includes a first memory unit that has a predetermined number of entries and stores part of registration information of data for the first cache memory; and a second memory unit that has entries less than the entries of the first memory unit and stores remaining part of the registration information.

According to another aspect of the present invention, a coherency maintaining method for maintaining coherency between a first cache memory and a second cache memory that stores data in the first cache memory, the method includes storing, in a first memory unit that has a predetermined number of entries, part of registration information of data for the first cache memory; and storing, in a second memory unit that has entries less than the entries of the first memory unit, remaining part of the registration information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a table of the meanings of codes to be stored in first-cache registration information;

FIG. 10 is one example of a data structure of first-cache detailed information;

FIG. 11 is a diagram for explaining a transition of tag registration information in response to a read request from the processor core;

FIG. 19 is a diagram showing stages until a state of a first level cache is obtained according to a conventional technology.

DETAILED DESCRIPTION OF THE PREFERRED EMBODIMENTS

Exemplary embodiments of the present invention are explained in detail below with reference to the accompanying drawings.

First, a characteristic of an embodiment of the present invention is explained in comparison with a conventional technology. In the present embodiment, part of registration information of data for a first level cache (hereinafter, "first-cache registration information") is retained by a second-level cache-tag unit, and detailed information for ascertaining or determining the registration state of the first level cache (or remaining part of the registration information of data for the first level cache; hereinafter, "first-cache detailed information") is searched for at the same timing as the access to the second-level cache-tag unit.

When the second level cache obtains a read request, the first-cache registration information includes information indicating whether data corresponding to the read request is shared by a plurality of first level caches (processor cores) (common information). When the data is not shared by the first level caches, the first-level cache registration information contains identification information of the first level cache that stores the data and registration information of the data (for example, information indicating that the data is registered in operand way 0 of a processor core 1 in an update version).

That is, when the data corresponding to the read request is not shared by the processor cores, the registration information of the data with respect to the first level cache can be obtained by the first-cache registration information. When the data is shared by the processor cores, the first-cache detailed information is referred to, to obtain the registration information of the data with respect to the respective processor cores, and the coherency is maintained between the first and second level caches.

Figure 1:
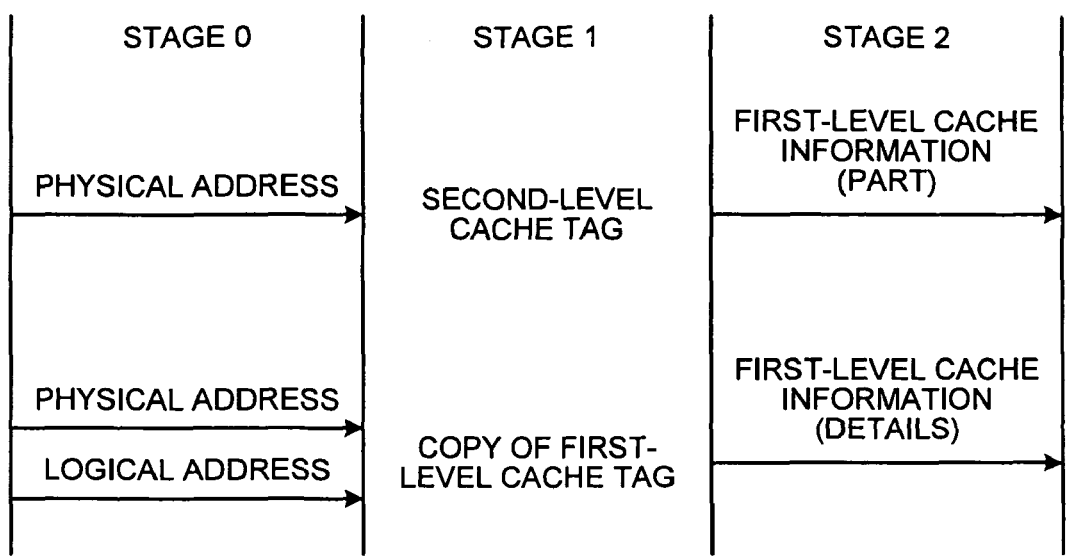
FIG. 1 is a diagram showing stages until a registration state of a first level cache is ascertained according to an embodiment of the present invention.

FIG. 1 depicts stages until a registration state of the first level cache of the present embodiment is ascertained. As shown in FIG. 1, when the second-level cache-tag unit is accessed by a physical address, because the first-cache registration information is included in the accessed second-level cache-tag unit, the registration information of the first level cache can be quickly ascertained.

In the present embodiment, because the first-cache detailed information is accessed by the physical address and a logical address at the same timing as the access to the second-level cache-tag unit, as required (that is, when detailed information of the first level cache is required), the two-step access such as in the conventional technologies can be avoided, and the machine cycle can be speeded up.

Figure 2:
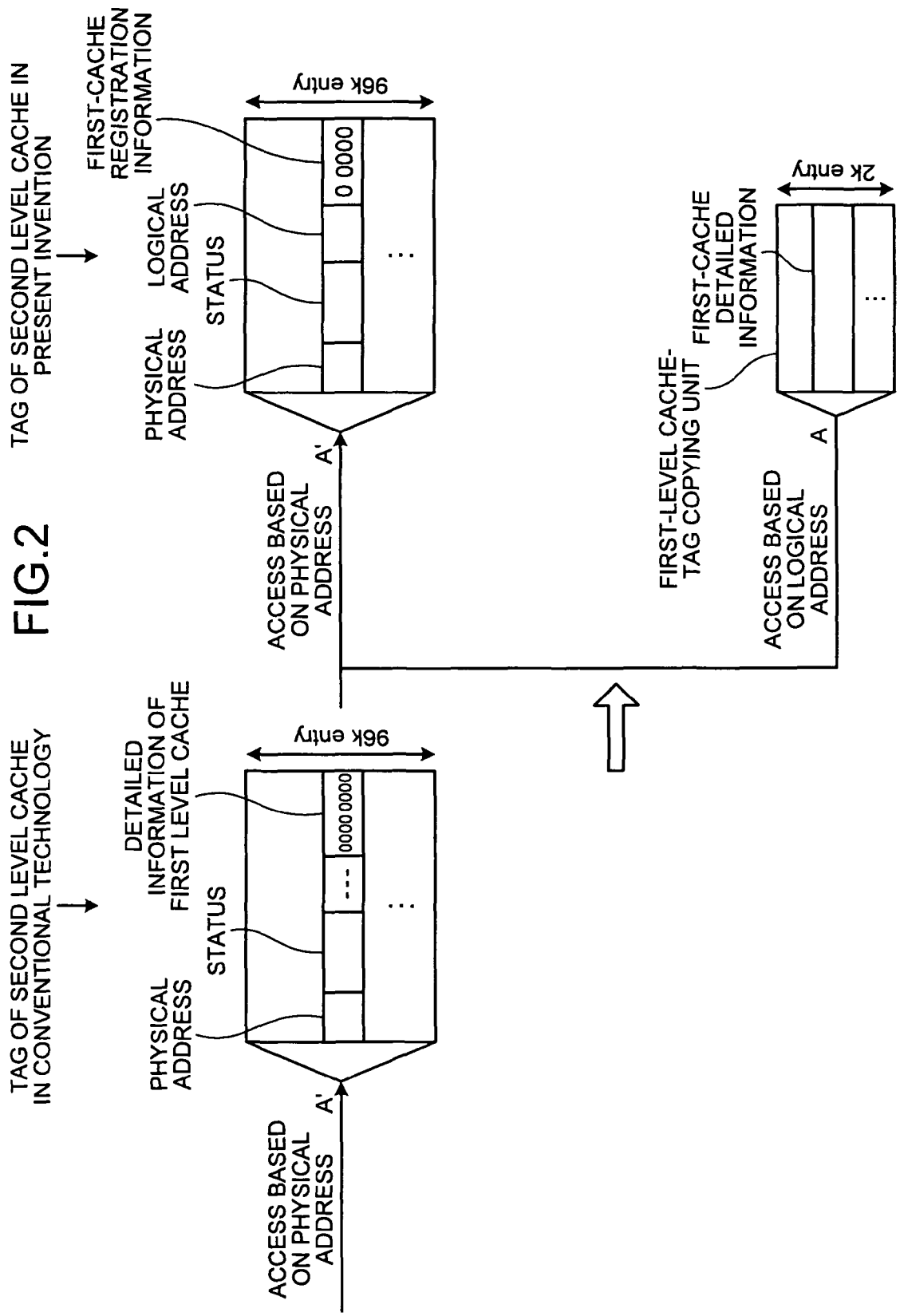
FIG. 2 is a diagram for explaining improvement of use efficiency of a second-level cache-tag unit according to the embodiment.

FIG. 2 is an explanatory diagram for explaining improvement of use efficiency of the second-level cache-tag unit of the present embodiment. The left side of FIG. 2 is one example of the conventional second-level cache-tag unit (one example of the second-level cache-tag unit disclosed in Japanese Patent Application No. 2004-222401), and the right side of FIG. 2 is one example of the second-level cache-tag unit of the present embodiment.

As shown on the left side of FIG. 2, in the conventional second-level cache-tag unit, a storage area of the second-level cache-tag unit has been used in units of 8 bits for each entry in the second level cache, as the detailed information of the first level cache. It is assumed here that there are two processor cores and two-way command/operand separate caches are used as the first level cache; however, this field increases in proportion to the number of processor cores and the number of ways of the first level cache.

On the other hand, as shown on the right side of FIG. 2, because the second-level cache-tag unit of the present embodiment does not store the detailed information of the first level cache (does not store 8-bit information) and stores 5 bits as the first-cache registration information, a memory capacity can be effectively used as compared with the conventional method. Because the first-cache registration information is stored in units of 5 bits for each entry, i.e., 3 bits less than in the conventional method.

The first-cache detailed information is stored in a first-level cache-tag copying unit, apart from the second-level cache-tag unit. Thus, because the detailed information (remaining part of the registration information) of the first level cache is stored in a unit other than the second-level cache-tag unit, the use efficiency of the second-level cache-tag unit is improved.

Because the second-level cache-tag unit of the present embodiment includes 3 bits less for each entry than the conventional second-level cache-tag unit, if it is assumed that the total number of entries with respect to the second-level cache tag is 96 k, a memory capacity of 288 k bits (3 bits×96 k) of the second-level cache-tag unit can be effectively used.

Further, if it is assumed that the first-cache detailed information stored in the first-level cache-tag copying unit includes 10 bits, the memory capacity required for the first-level cache-tag copying unit becomes 160 k bits (2 k×10 bits×8) (here, because there are two two-way command caches and operand caches for the two processors, 8 is multiplied).

That is, even when the first-cache detailed information stored in the first-level cache-tag copying unit is taken into consideration, the resources can be used more effectively than in the conventional second level cache.

Figure 3:
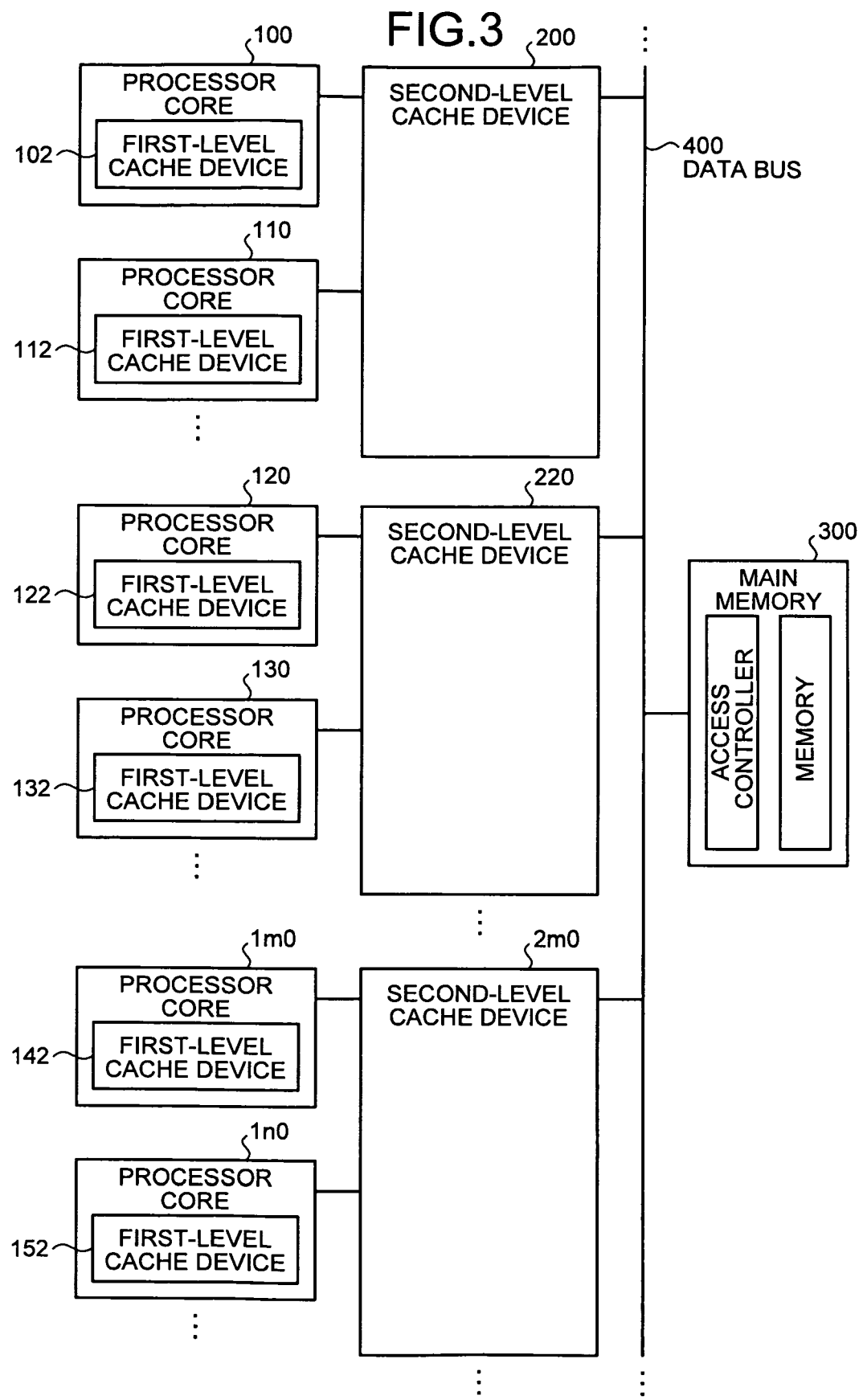
FIG. 3 is a block diagram of a configuration of a system according to the embodiment.

FIG. 3 depicts a configuration of the system according to the present embodiment. As shown in FIG. 3, in the system, a second-level cache device 200 is connected to a plurality of cores such as processor cores 100 and 110 having the first-level cache device. It is also connected to a main memory 300 together with other second-level cache devices 220 to 2m0 (m is a natural number) via a data bus 400. For convenience, the processor cores 100 and 110, the second-level cache device 200, and the main memory 300 are mainly explained.

An associative system in the system of the present embodiment is a two-way set associative system having two types of ways (way 0 and way 1) where the number of processors are two; however, the present invention is not limited by the number of ways, the associative system, and the number of processor cores.

Figure 4:
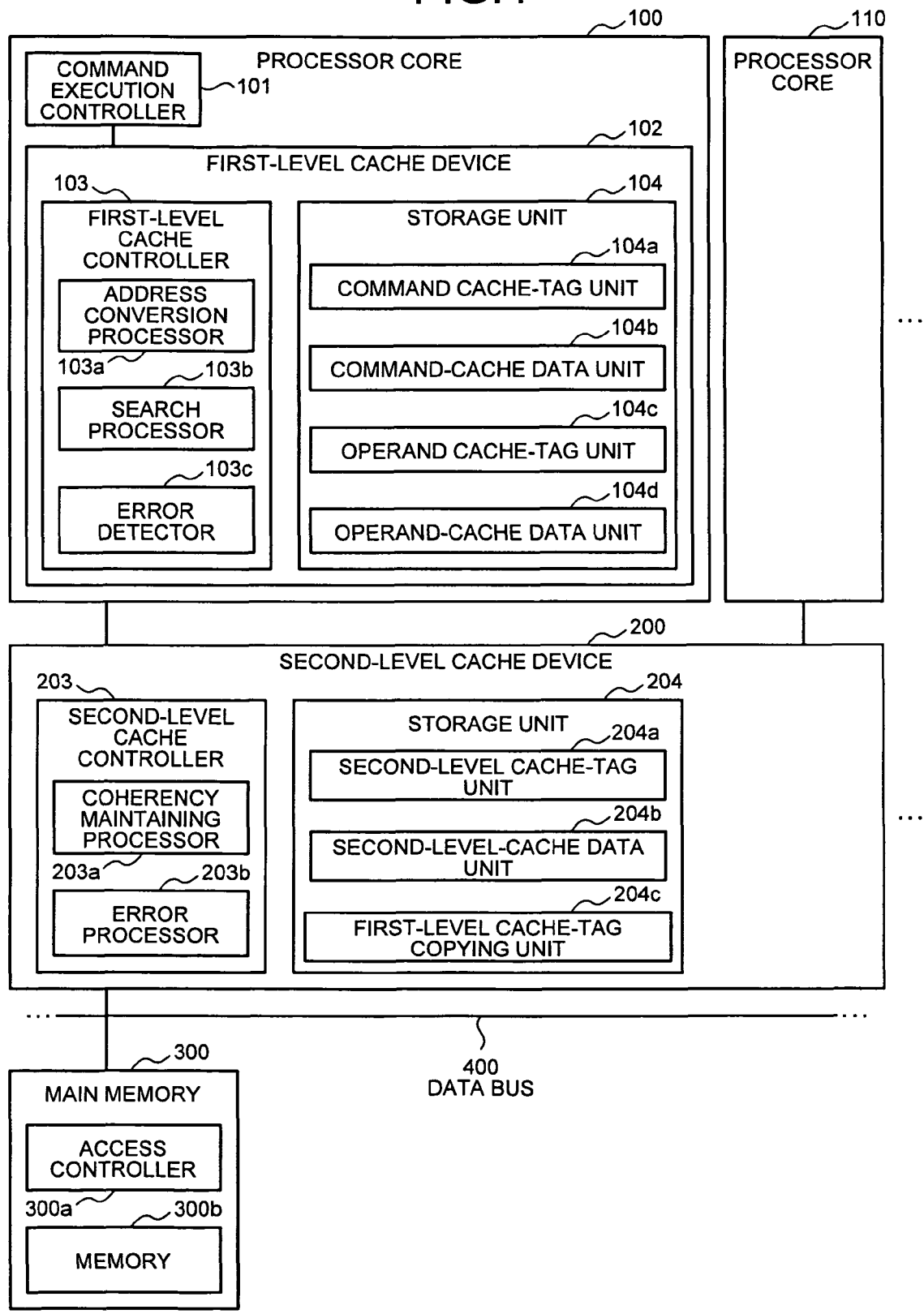
FIG. 4 is a block diagram of a configuration of a processor core, a second-level cache device, and a main memory shown in FIG. 3.

FIG. 4 depicts the configuration of the processor core (including the first-level cache device), the second-level cache device 200, and the main memory 300. As shown in FIG. 4, the second-level cache device 200 is connected to the processor cores 100 and 110, and also connected to the main memory 300 via the data bus 400.

The processor cores 100 and 110 respectively have a command execution controller 101 and a first-level cache device 102. The processor core 100 and the processor core 110 are of basically the same configuration, and thus but one of them, the processor core 100, is explained below.

The command execution controller 101 transmits a logical address to the first-level cache device 102 to obtain data corresponding to the logical address from the first-level cache device 102 and executes predetermined processing based on the obtained data.

Having obtained logical address information from the command execution controller 101, the first-level cache device 102 searches for data corresponding to the obtained logical address information and transmits the searched data to the command execution controller 101. As shown in FIG. 4, the first-level cache device 102 includes a first-level cache controller 103 and a storage unit 104.

The first-level cache controller 103 includes an address conversion processor 103a, a search processor 103b, and an error detector 103c. Having obtained the logical address information from command execution controller 101, the address conversion processor 103a converts the obtained logical address information to physical address information.

Figure 5:
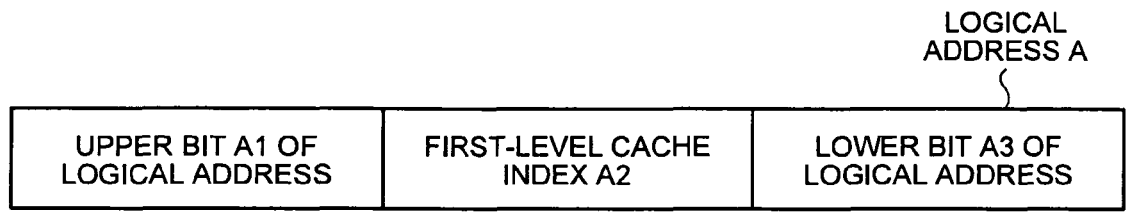
FIG. 5 is one example of a data structure of a logical address.

FIG. 5 is one example of a data structure of the logical address information. As shown in FIG. 5, a logical address A has an upper bit A1 of the logical address, a first-level cache index A2, and a lower bit A3 of the logical address. The information stored in the upper bit A1 of the logical address is converted to the physical address and used for determining whether to hit the data requested by the command execution controller 101.

Information for specifying an entry position of the tag stored in the storage unit 104 in the first-level cache device 102 is stored in the first-level cache index A2. Other pieces of information are stored in the lower bit A3 of the logical address.

Figure 6:
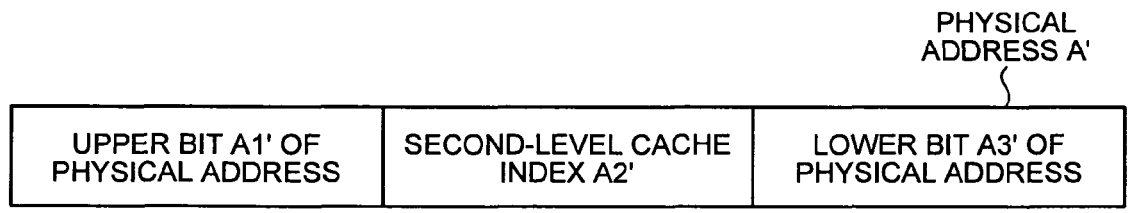
FIG. 6 is one example of a data structure of a physical address.

Subsequently, the physical address information generated by converting the logical address information by the address conversion processor 103a is explained. FIG. 6 is one example of the data structure of a physical address A'. As shown in FIG. 6, the physical address A' has a upper bit A1' of the physical address, a second-level cache index A2', and a lower bit A3' of the physical address.

A tag comparing address is stored in the upper bit A1' of the physical address. The tag comparing address is used for determining whether the data is hit. Specifically, if the physical address stored in the tag specified by the first-level cache index A2 shown in FIG. 5 and the tag comparing address are the same, the data is hit, and if not, the data is not hit.

Information for specifying the position of the tag stored in a storage unit 204 in the second-level cache device 200 is stored in the second-level cache index A2'. Other pieces of information are stored in the lower bit A3' of the physical address.

The search processor 103b determines whether the data requested from the command execution controller 101 (data corresponding to the logical address A) is in the storage unit 104. When the requested data is in the storage unit 104, the search processor 103b transmits the data to the command execution controller 101.

On the other hand, when the data requested from the command execution controller 101 is not in the storage unit 104, the search processor 103b transmits the information indicating this matter to the second-level cache device. The search processor 103b performs write back processing for the data stored in the storage unit 104.

Subsequently, a process performed by the search processor 103b is specifically explained. The search processor 103 searches for the corresponding tag from a command cache-tag unit 104a or an operand cache-tag unit 104c based on the first-level cache index A2 included in the logical address A.

The command cache-tag unit 104a holds registration information (tag) of the data registered in a command-cache data unit 104b. The command cache data unit 104b holds the data registered in the command cache.

The operand cache-tag unit 104c holds the registration information (tag) of the data registered in an operand-cache data unit 104d. The operand-cache data unit 104d holds the data registered in the operand cache.

Figure 7:
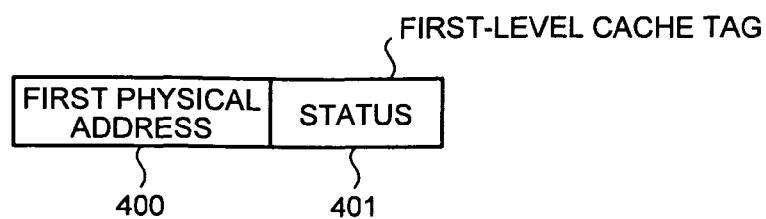
FIG. 7 is one example of a data structure of a first-level cache tag.

In the present embodiment, the tag stored in the command cache-tag unit 104a or the operand cache-tag unit 104c is represented as a first-level cache tag in the following explanations. FIG. 7 is one example of a data structure of the first-level cache tag. As shown in FIG. 7, the first-level cache tag has a first physical address 400 and a status 401.

The first physical address 400 stores an address to be compared with the upper bit A1' of the physical address (tag comparing address). The search processor 103b compares the address to be stored in the first physical address 400 with the address stored in the upper bit A1' of the physical address, and when the addresses match each other, determines that the data requested by the command execution controller 101 is hit. The search processor 103b transmits the corresponding data to the command execution controller 101.

On the other hand, when the addresses do not match each other, the search processor 103b determines that the data requested by the command execution controller 101 is not hit. The status 401 stores information indicating whether the first-level cache tag is valid, and whether the data is updated.

When it is determined that the first physical address 400 of the first-level cache tag does not match the upper bit A1' of the physical address, the data requested by the command execution controller 101 is not in the first-level cache device 102. Therefore, the search processor 103b transmits the physical address A' and the first-level cache index A2 to the second-level cache device 200 in order to obtain the corresponding data.

The error detector 103c detects an error occurring in the command cache-tag unit 104a, the command-cache data unit 104b, the operand cache-tag unit 104c, and the operand-cache data unit 104d.

When detecting an error, the error detector 103c notifies the second-level cache device 200 of this matter and transmits information for specifying the way on the command side or the operand side of the first-level cache index A2 involved with the data having the error and the first-level cache device 102 having the error (hereinafter, "error way specifying information") to the second-level cache device 200.

When obtaining the error way specifying information from the error detector 103c, the second-level cache device 200 searches a corresponding first-level cache-tag copying unit 204c based on the error specifying information to determine whether to invalidate or write back the error data to the first-level cache device 102, and sends a processing request to the error detector 103c. As a result, an entry having the error is deleted from the first-level cache device 102. That is, when the error occurs in the first-level cache device 102, the second-level cache device 200 refers to the first-level cache-tag copying unit 204c to correct the data having the error.

Subsequently, the second-level cache device 200 is explained. The second-level cache device 200 includes a second-level cache controller 203 and the storage unit 204. The second-level cache controller 203 maintains coherency between the first-level cache device 102 and the second-level cache device 200. The second-level cache controller 203 includes a coherency maintaining processor 203a and an error processor 203b.

The coherency maintaining processor 203a searches the storage unit 204 for the corresponding data, in response to a request from the first-level cache device 102, and transmits retrieved data to the first-level cache device 102. The coherency maintaining processor 203a maintains coherency between the first-level cache device 102 and the second-level cache device 200. The coherency maintaining processor 203a performs the write back processing for the data stored in the storage unit 204 in the second-level cache device 200.

The storage unit 204 stores a second-level cache-tag unit 204a, a second-level-cache data unit 204b, and the first-level cache-tag copying unit 204c. The second-level cache-tag unit 204a stores registration information of data registered in the second-level-cache data unit 204b in association with the first-cache registration information. The second-level-cache data unit 204b holds the data registered in the second level cache.

The first-level cache-tag copying unit 204c is a tag for storing information for supplementing the first-cache registration information stored in the second-level cache-tag unit 204a.

The error processor 203b determines whether a cache access is normally performed, and when an error occurs, the error processor 203b relieves the error. When an error occurs in the first-level cache device 102, the error processor 203b refers to the first-level cache-tag copying unit 204c to correct the data having the error. When referring to the first-level cache-tag copying unit 204c, the error processor 203b determines whether the data having the error can be deleted, and when the data can be deleted, forcibly deletes the corresponding data from the first-level cache device 102.

The main memory 300 stores data and a program for executing predetermined processing. The main memory 300 includes an access controller 300a and a memory 300b. The access controller 300a controls an access to the second-level cache device 200 or a hard disk (not shown). The memory 300b stores data transferred from the second-level cache device or the hard disk.

Next, the processing performed by the coherency maintaining processor 203a is specifically explained. The coherency maintaining processor 203a obtains the physical address A' and the first-level cache index A2 from the first-level cache device 102, and searches the second-level cache-tag unit 204a for the corresponding tag based on the second-level cache index A2' included in the physical address A'. In the present embodiment, the tag stored in the second-level cache-tag unit 204a is represented as the second-level cache tag.

Figure 8:
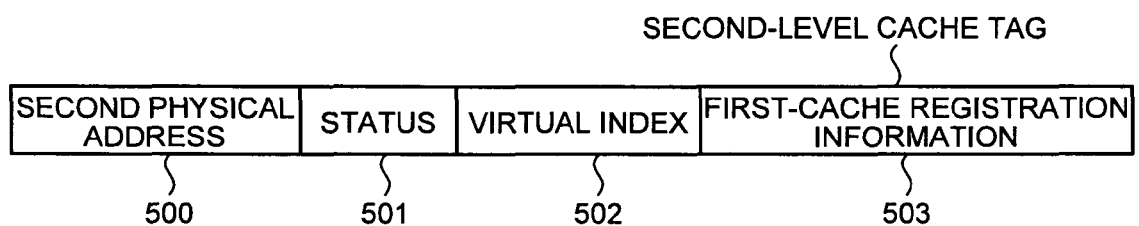
FIG. 8 is one example of a data structure of a second-level cache tag.

FIG. 8 is one example of a data structure of the second-level cache tag. As shown in FIG. 8, the second-level cache tag includes a second physical address 500, a status 501, a virtual index 502, and first-cache registration information 503.

The coherency maintaining processor 203a compares the data stored in the second physical address 500 with the information stored in the upper bit A1' of the physical address, and when the data match each other, it means that the data requested from the command execution controller 101 is stored in the storage unit 204. On the other hand, when the data stored in the second physical address 500 does not match the upper bit of the physical address, the requested data is not in the second-level cache device 200, and therefore the coherency maintaining processor 203a obtains the corresponding data from the main memory 300.

The status 501 stores information indicating whether the second-level cache tag is valid. The virtual index 502 stores information for determining whether the data is a synonym. The coherency maintaining processor 203a compares the data stored in the first-level cache index A2 with the data stored in the virtual index 502, and when the data are the same, determines that the tag is not a synonym.

On the other hand, when the data are not the same, the coherency maintaining processor 203a determines that the data is a synonym. upon determining that the data is a synonym, the coherency maintaining processor 203a requests the first-level cache device 102 to invalidate the data or to perform the write back processing to thereby delete the data, which is a synonym target, from the first-level cache device 102, by using the second physical address 500 and the virtual index 502 included in the second-level cache tag, the second-level cache index A2', the lower bit A3' of the physical address, and the first-cache registration information 503.

The coherency maintaining processor 203a then transmits the data requested from the command execution controller 101 to the first-level cache device 102, and stores the information used for the access in the virtual index 502.

The first-cache registration information 503 stores the registration information involved with the first-level cache device 102. The coherency maintaining processor 203a can ascertain the registration state of the first-level cache device 102 by referring to the first-cache registration information. However, when the processor cores share the same data, the coherency maintaining processor 203a can only ascertain information indicating that the data is shared by the processor cores.

That is, when the data is not shared by the processor cores, the coherency maintaining processor 203a can obtain the registration state of the data with respect to the first-level cache device 102 based on the first-cache registration information. However, when the data is shared by the processor cores, the coherency maintaining processor 203a needs to obtain the registration information of the respective data by referring to the first-level cache-tag copying unit 204c.

FIG. 9 is a table of the meanings of codes stored in the first-cache registration information 503. The first-cache registration information 503 includes 5 bits, 4 bits of which indicate the meaning as shown in FIG. 9.

The remaining 1 bit is used for identifying the processor core. For example, "0" is stored in the bit when the processor core 100 holds the information, while "1" is stored in the bit when the processor core 110 holds the information except in the case where other 4 bits are "0001".

When the second-level cache tag is shared by the processor cores 100 and 110, "0001" is stored in the first-cache registration information 503. This means that the respective processor cores 100 and 110 have the same data indicated by the second-level cache tag; however, it is unknown how the data is registered in the first-level cache device 102. That is, information regarding the command side, the operand side, and the way is insufficient. However, because the data is shared, it is ensured that the data itself is a shared version.

The amount of information in the second-level cache-tag unit 204a can be reduced by expressing the state in which the tag is shared by the processor cores by 1 code. In the present embodiment, as one example, the first-cache registration information 503 includes 5 bits; however, the present invention is not limited thereto, and the first-cache registration information 503 can include any number of bits.

In FIG. 9, "update version" indicates that the data involved with the first-level cache device 102 can be rewritten, and "shared version" indicates that the data involved with the first-level cache device 102 is not rewritten. Rewrite of data occurs only in the operand cache. The coherency maintaining processor 203a refers to the first-cache registration information 503 included in the second-level cache tag shown in FIG. 8, to enable to ascertain the registration state of the first-level cache device 102 at high speed.

Subsequently, the data structure of the first-cache detailed information held by the first-level cache-tag copying unit 204c is explained. FIG. 10 is one example of the data structure of the first-cache detailed information. As shown in FIG. 10, the first-cache detailed information includes a second-level cache address 600, a second cache way 601, and a status 602.

The first-cache detailed information corresponds to one way of the first level cache. Accordingly, in a system including two-way command caches and operand caches for the two processors, eight pairs of the first-cache detailed information are used. The coherency maintaining processor 203a accesses the first-cache detailed information stored in the first-level cache-tag copying unit 204c based on the logical address.

In the second-level cache address 600 is stored a difference between the physical address used as an index for searching the second-level cache-tag unit 204a and the logical address used as an index for searching the first-level cache-tag copying unit 204c.

For example, when it is assumed that the physical address A' includes bits [40:0] (from 40th bit to 0th bit), the second-level cache index A2' includes bits [18:10], the first-level cache index A2 include bits [15:7], and a common part of the logical address and the physical address has bits [12:0], bits [18:13] of the physical address A' is stored in the second-level cache address 600.

In the coherency maintaining processor 203a, when the information stored in the second-level cache address 600 matches the physical address A' requested from the command execution controller 101, and the information stored in the second cache way 601 is equal to the way hit as a result of search of the second-level cache device 200 based on the physical address A', the information of the first level cache corresponding to the first-level cache-tag copying unit 204c can be obtained.

The coherency maintaining processor 203a uses the information stored in the first-level cache-tag copying unit 204c to change the state in which the second-level cache tag (shown in FIG. 8) is shared by the processor cores (code 0001) to another state.

For example, when it is assumed that the data stored in the first-level cache device 102 is deleted due to replacement, and there is an entry (second-level cache tag) in which the shared state is dissolved. If there is no first-level cache-tag copying unit 204c, the coherency maintaining processor 203a needs to scan the data stored in the second-level cache device 200 for searching for the entry to be released.

This is because the first-level cache tag is searched for based on the logical address, and the second-level cache tag is searched for based on the physical address. That is, the corresponding data can be registered in the entry indicated by a difference obtained by excluding the shared part from the address used for the index.

However, the first-cache registration information can be quickly updated by referring to the first-cache detailed information stored in the first-level cache-tag copying unit 204c.

Further, in the present embodiment, when an error occurs at the time of transition from the state in which the second-level cache tag is shared by the processor cores (code 0001) to another state, the error processor 203b executes error processing by using the first-cache detailed information.

When the second-level cache device 200 performs replacement, because the cache memory has the hierarchical structure, the data block also needs to be deleted from the first-level cache device 102. At this time, when the data block is shared by the processor cores (code 0001), the coherency maintaining processor 203a issues a request to invalidate the data to the both processor cores (for example, processor cores 100 and 110).

The first-level cache device 102 that has received the invalidation request from the second-level cache device 200 searches for the first-level cache tag and deletes the data registered in the hit way. This is because the logical address used at the time of searching the first-level cache-tag copying unit 204c is different from the logical address of an entry to be replaced in the second level cache, and therefore the result cannot be used. When an error occurs in the first-level cache tag at this point in time, the determination whether to delete the data block corresponding to the tag having the error cannot be performed.

When an error has occurred in the first-level cache tag, the first-level cache device 102 transmits an error report and the logical address of the tag having the error to the second-level cache device 200. The second-level cache device 200 searches the first-level cache-tag copying unit 204c for the information of the tag corresponding to the received logical address to thereby perform error recovery. When there is a hit in the search of the first-level cache-tag copying unit 204c, the second-level cache device 200 issues the invalidation request to the first-level cache device again. Because there is a hit in the first-level cache-tag copying unit 204c and the information on the tag having the error is obtained, the second-level cache device 200 can execute the invalidation request without searching for the first-level cache tag.

Processing when the coherency maintaining processor 203a obtains a read request from the processor core is explained next. FIG. 11 is an explanatory diagram for explaining a transition of tag registration information due to the read request from the processor core.

As shown on the left side of FIG. 11, having received the read request including the physical address A' and the logical address A from the processor core 100, the coherency maintaining processor 203a searches the second-level cache-tag unit 204a for an entry corresponding to the physical address A'. In an example shown in FIG. 11, because the data is registered in the physical address A' of the second-level cache-tag unit 204a and the status is valid, the data is hit. Because the valid data is not registered in the first-level cache device 102, there is no valid data corresponding to the logical address in the first-level cache-tag copying unit 204c.

When registering the data of which read has been requested by the first-level cache device 102 is registered in, for example, way 0 of the command cache, as shown on the right side of FIG. 11, the coherency maintaining processor 203*a* registers the logical address A in the virtual index 502, registers identification information "0" of the processor core 100 in the 1st bit of the first-cache registration information, and a registers code 1000 (registered as the shared version in command way 0; see FIG. 9) in from the 2nd bit to the 5th bit.

The coherency maintaining processor 203*a* also registers the difference between the physical address A' and the logical address A in the second-level cache address 600 of the entry in the first-level cache-tag copying unit 204*c* corresponding to the logical address A, registers "way 0" in the second cache way 601, and registers "valid (val)" in the status 602.

Figure 12:
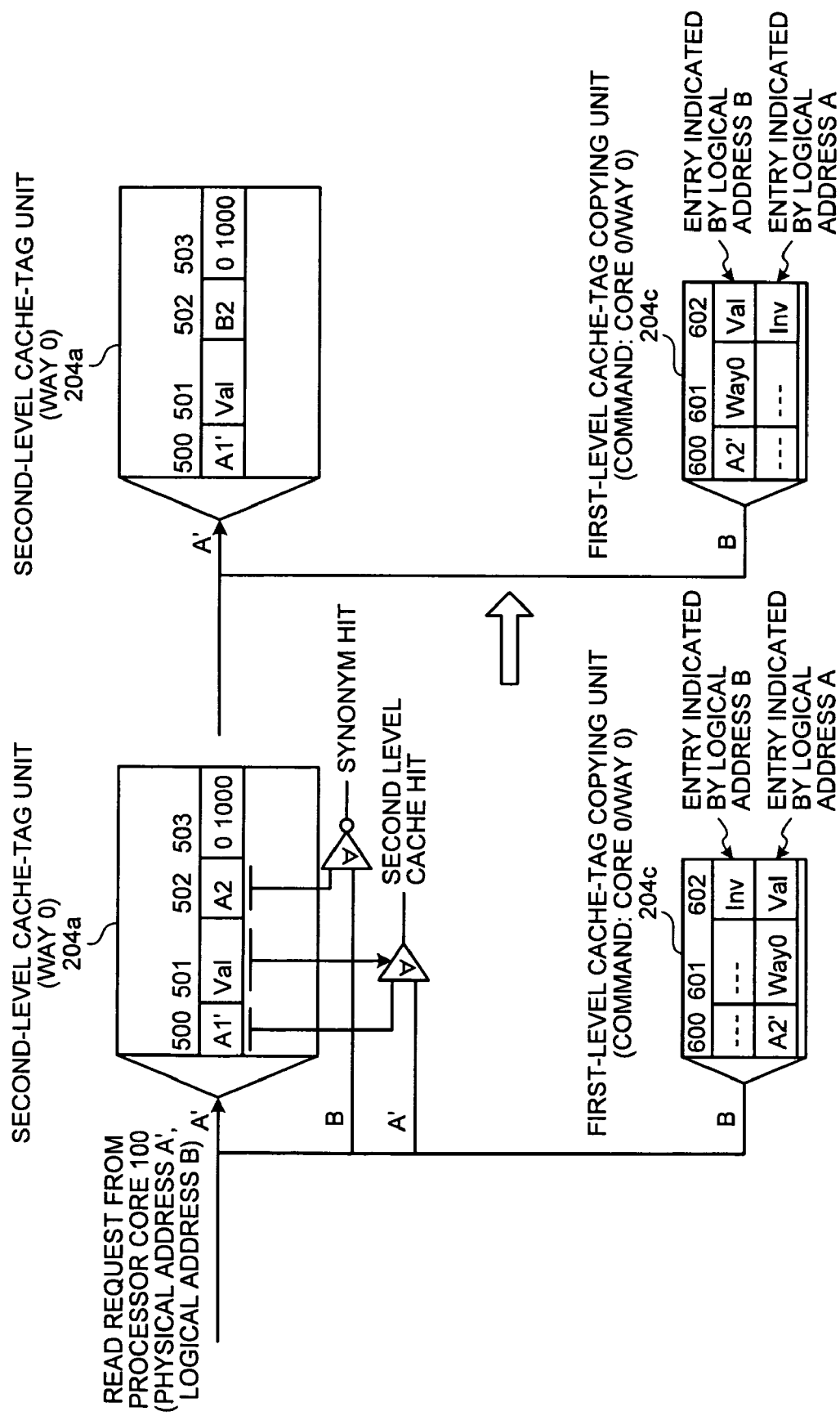
FIG. 12 is a diagram for explaining a transition of tag registration information from a synonym state.

Described next is the operation of the coherency maintaining processor 203*a* when the information is in a synonym state. FIG. 12 is an explanatory diagram for explaining a transition of the tag registration information from the synonym state.

As shown on the left side of FIG. 12, when receiving the read request including the physical address A' and the logical address A from the processor core 100, the coherency maintaining processor 203*a* searches the second-level cache-tag unit 204*a* for an entry corresponding to the physical address A'. In an example shown in FIG. 12, because the data is registered in the physical address A' of the second-level cache-tag unit 204*a* and the status is valid, the data is hit.

However, because the logical address A is registered in the virtual index 502, which is different from the logical address included in the read request, it is a synonym hit. When there is a synonym hit, the coherency maintaining processor 203*a* requests the first-level cache device 102 to invalidate the entry corresponding to the logical address A.

When invalidation of the entry with respect to the logical address A performed by the first-level cache device 102 is complete, as shown on the right side of FIG. 12, the coherency maintaining processor 203*a* updates the data registered in the first-level cache-tag copying unit 204*c*. Specifically, the coherency maintaining processor 203*a* registers a logical address B in the virtual index 502 of the second-level cache-tag unit 204*a*. The coherency maintaining processor 203*a* updates the information registered in the first-level cache-tag copying unit 204*c*. That is, the coherency maintaining processor 203*a* invalidates the entry with respect to the logical address A, and registers the "difference between the physical address A' and the logical address B", "way 0", and "valid", respectively, in the second-level cache address 600, the second-level cache way 601, and the a status 603 corresponding to the logical address B.

Figure 13:
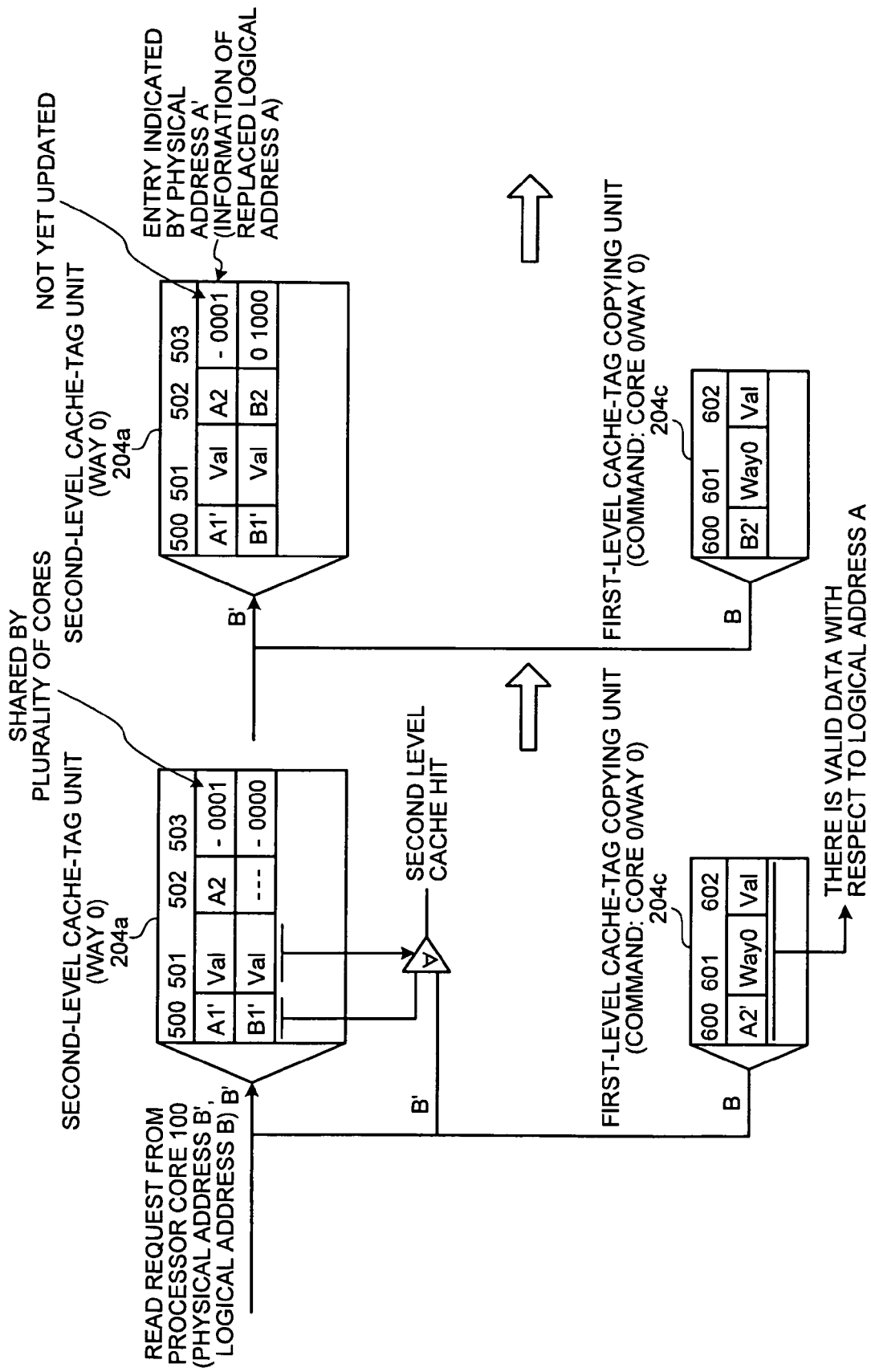
FIGS. 13 and 14 are diagrams for explaining a transition from a shared state to another state between the processor cores.
Figure 14:
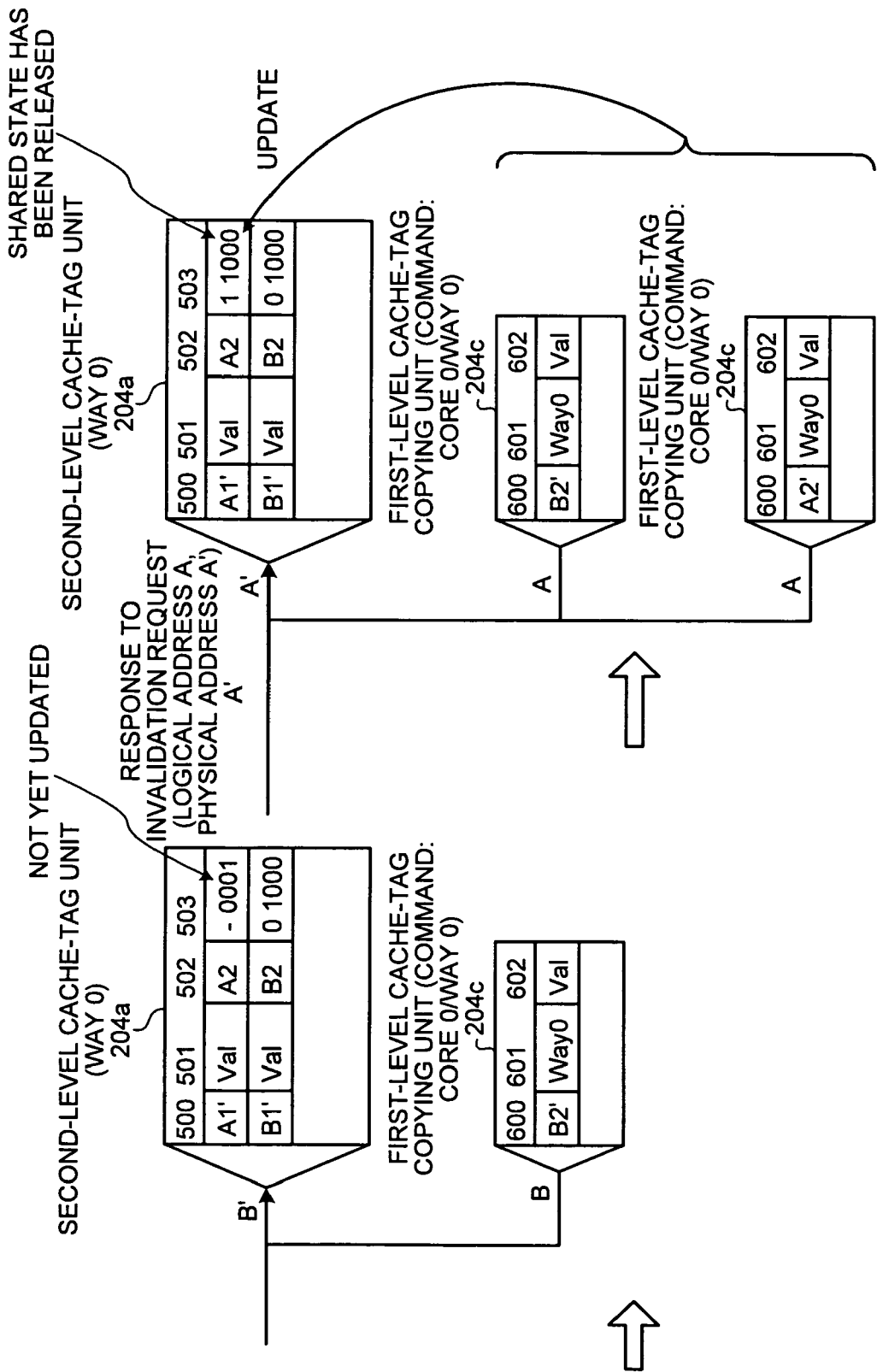

Processing for changing the shared state between the processor cores in the second-level cache-tag unit 204*a* and the first-level cache-tag copying unit 204*c* to another state performed by the coherency maintaining processor 203*a* is explained next. FIGS. 13 and 14 are diagrams for explaining a transition from the shared state between the processor cores to another state.

As shown on the left side of FIG. 13, having received the read request including a physical address B' and the logical address B from the processor core 100, the coherency maintaining processor 203*a* searches the second-level cache-tag unit 204*a* for the entry corresponding to the physical address B'. In an example shown in FIG. 13, in the second-level cache-tag unit 204*a*, the data with respect to the physical address A' is hit; however, because the valid data with respect to the logical address A is registered in the entry corresponding to the logical address B of the first-level cache-tag copying unit 204*c*, replacement occurs. The coherency maintaining processor 203*a* transmits the data registered in the physical address B' and the data invalidation request of the logical address A to the processor core 100.

As shown on the right side of FIG. 13 (also on the left side of FIG. 14), in the middle of state transition, the second-level cache-tag unit 204*a* and the first-level cache-tag copying unit 204*c* are updated, however, the replaced information of the logical address A is still old (code 0001).

Subsequently, as shown on the right side of FIG. 14, the coherency maintaining processor 203*a* obtains a response to the invalidation request of the logical address A (the physical address A') (hereinafter, "invalidation response") from the processor core 100. The coherency maintaining processor 203*a* searches the first-level cache-tag copying unit 204*c*, based on the logical address A included in the invalidation response, to ascertain the state of the first level cache having the logical address, and updates the first-cache registration information of the entry with respect to the physical address A' based on the ascertained information.

Figure 15:
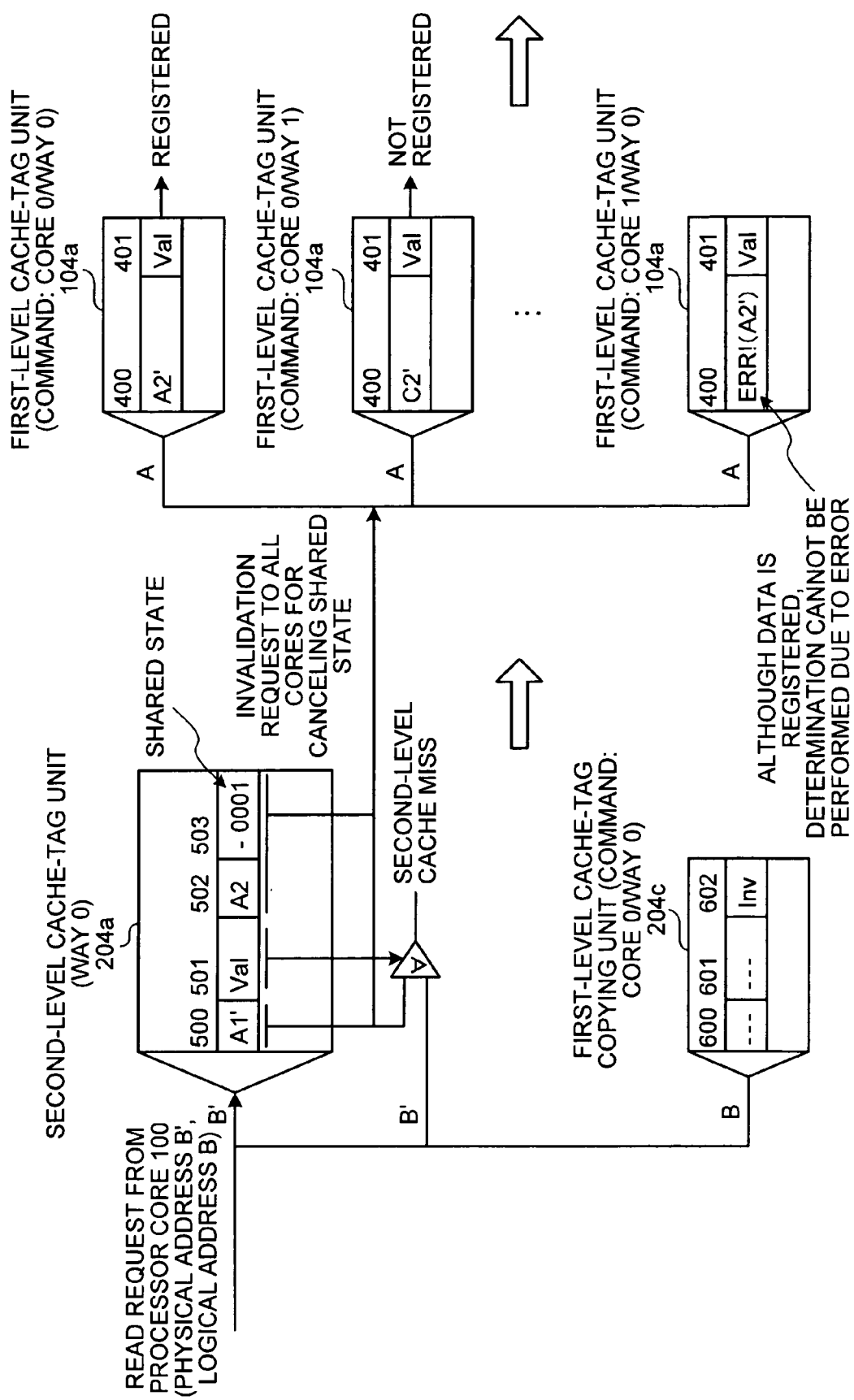
FIGS. 15 and 16 are diagrams for explaining processing when an error occurs during transition of the registration state.
Figure 16:
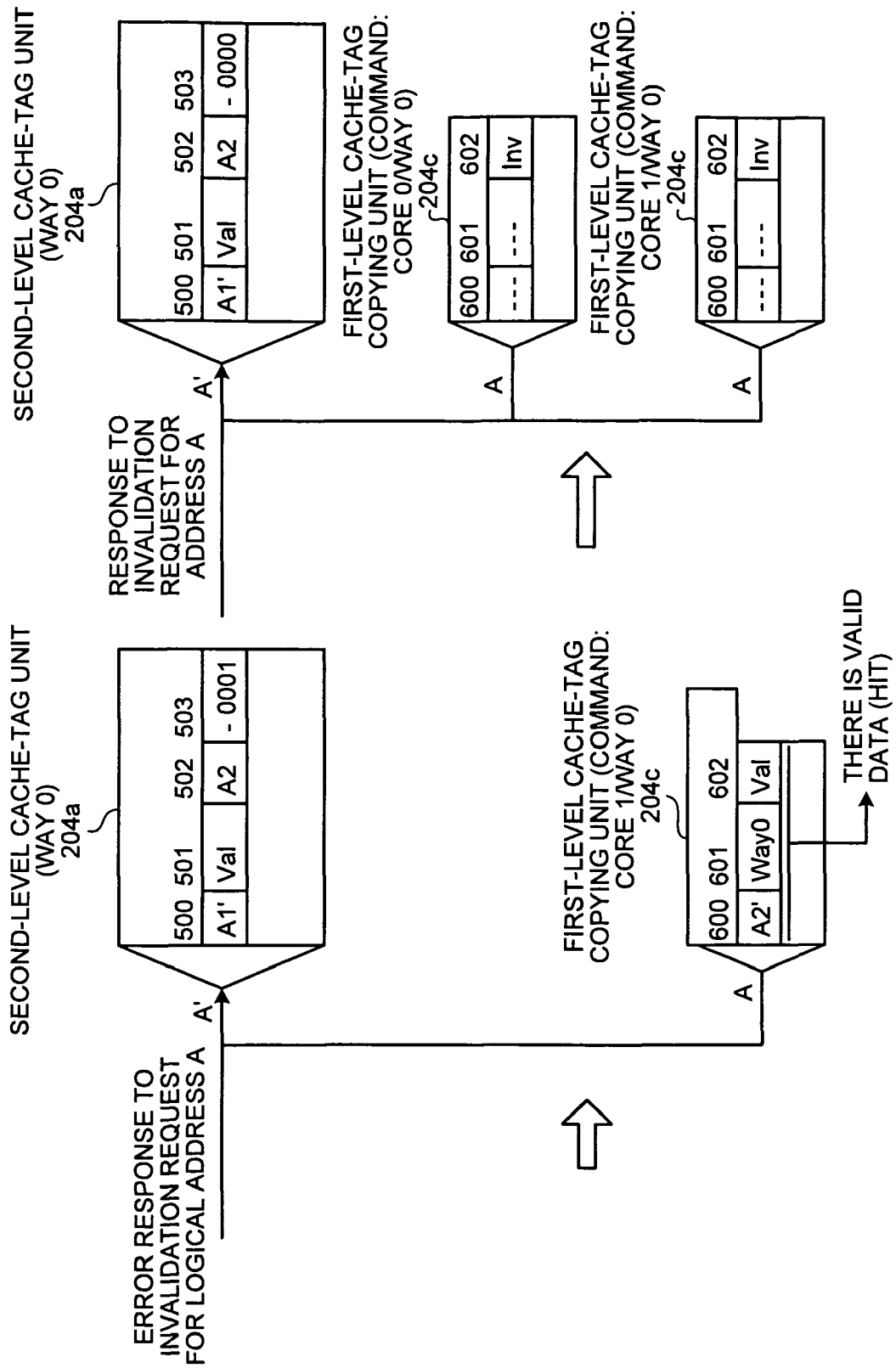

Processing when an error occurs during the transition of the registration state is explained next. FIGS. 15 and 16 are diagrams for explaining the processing when an error occurs during the transition of the registration state. As shown in FIGS. 15 and 16, having received the read request including the physical address B' and the logical address B from the processor core 100, the coherency maintaining processor 203*a* searches for the entry corresponding to the physical address B'.

In an example on the left side of FIG. 15, because the corresponding data is not registered in the second level cache and another valid data is registered in the entry with respect to the physical address B', replacement occurs in the second-level cache device. Because the data to be replaced is in a shared state, the coherency maintaining processor 203*a* issues the invalidation request to all processor cores 100.

Having received the invalidation request (for example, invalidation request to the logical address A) from the second-level cache device 200, the processor core 100 (the first-level cache device 102) searches the first-level cache tag (in the example shown in FIG. 15, the command cache-tag unit 104*a*) for the entry corresponding to the logical address A. As shown on the right side of FIG. 15, the processor core 100 deletes the data registered in the entry when there is the corresponding entry. When an error occurs at the time of reading the data stored in the tag, it is unclear whether the data is hit, and it cannot be determined whether the data is to be deleted.

The processor core 100 transmits an error response to the invalidation request including the physical address A' and the logical address A to the second-level cache device 200. Having received the error response, the second-level cache device searches the first-level cache-tag copying unit 204*c* based on the logical address A, and determines whether the data is hit, that is, whether the data is to be deleted. When the data is hit, the coherency maintaining processor 203*a* issues the invalidation request to the processor core 100 again; however, because the data to be deleted has been already decided, a search for the first-level cache tag is not required, an error can be avoided.

Subsequently, as shown on the right side of FIG. 16, the coherency maintaining processor 203*a* obtains the invalidation response from the respective processor cores having made the invalidation request, invalidates the entry in the first-level cache-tag copying unit 204*c*, and registers code "0000 (indicating that there is no data)" in the first-cache registration information 503 of the second-level cache-tag unit 204a.

Figure 17:
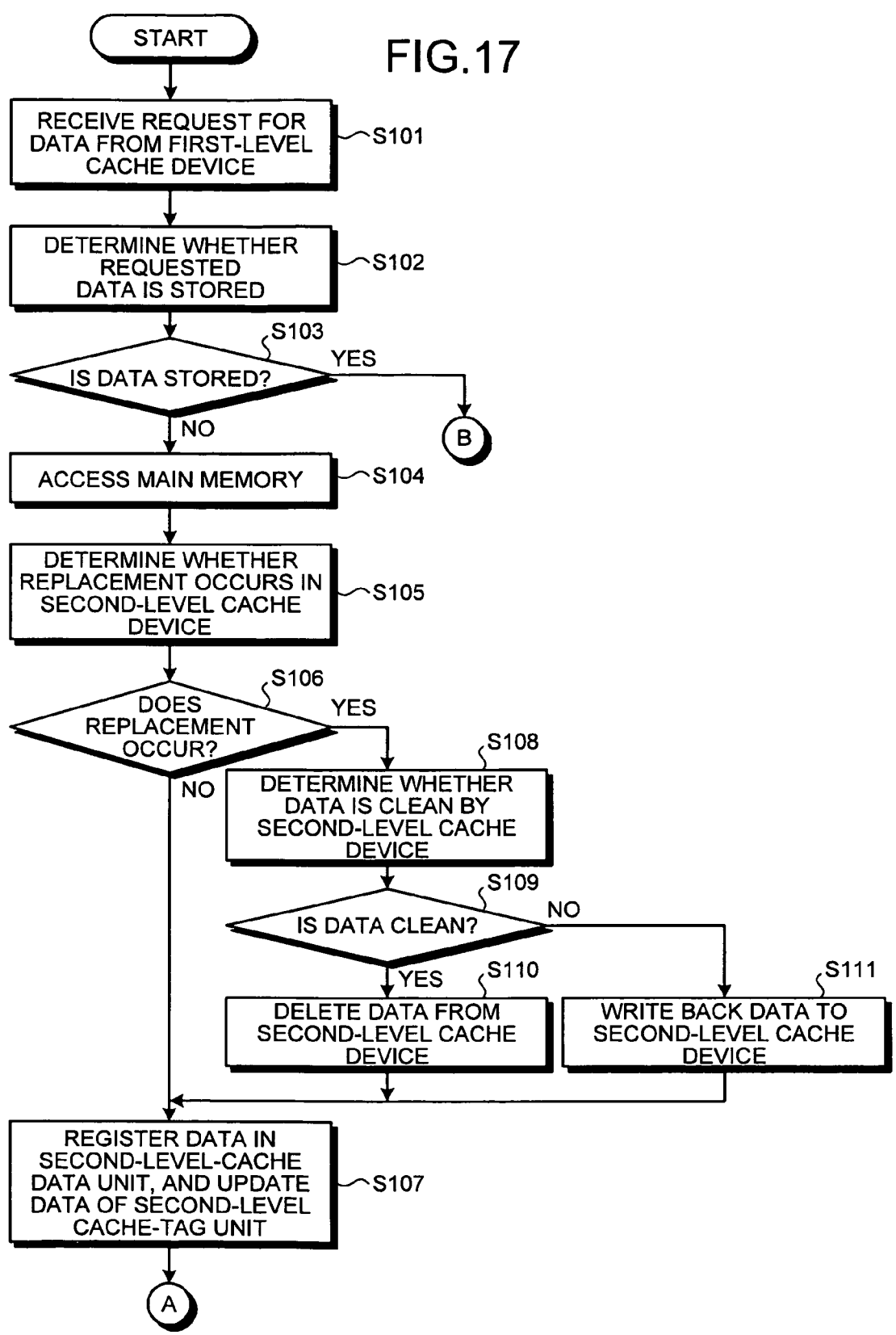
FIGS. 17 and 18 are flowcharts of the operation of the second-level cache device.
Figure 18:
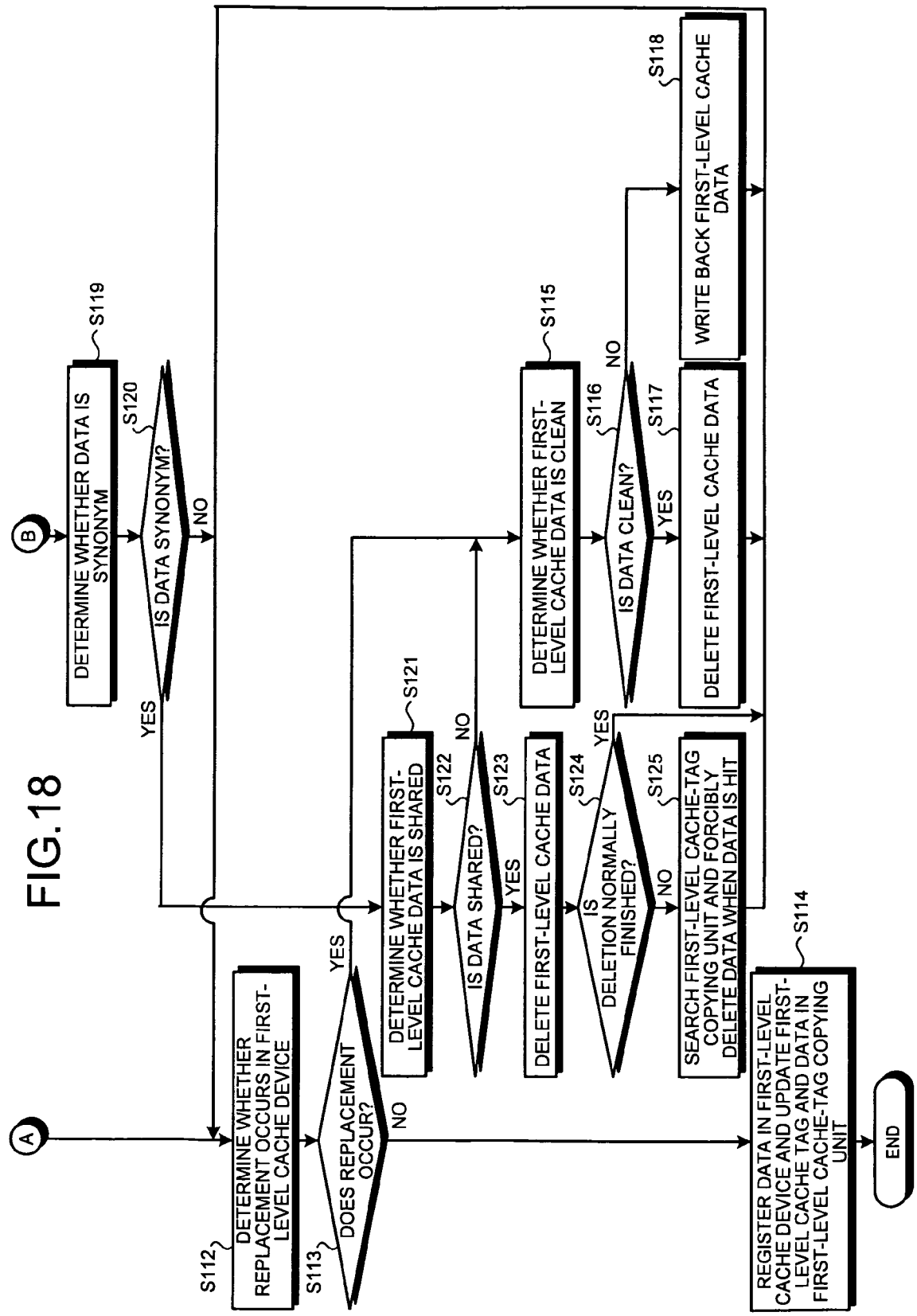

FIGS. 17 and 18 are flowcharts of the operation of the second-level cache device 200.

As shown in FIGS. 17 and 18, the second-level cache device 200 receives a request for data from the first-level cache device 102 (step S101), and determines whether the second-level cache device 200 stores the requested data (step S102).

When the second-level cache device 200 does not store the requested data (NO at step S103), the second-level cache device 200 accesses the main memory 300 (step S104) to determine whether replacement occurs in the second-level cache device 200 (step S105).

When replacement has not occurred in the second-level cache device 200 (NO at step S106), the second-level cache device 200 registers the data to be obtained from the main memory 300 in the second-level-cache data unit 204b, and updates the data of the second-level cache-tag unit 204a (step S107).

On the other hand, when replacement has occurred in the second-level cache device 200 (YES at step S106), the second-level cache device 200 determines whether the data is clean (step S108). When the data is clean (YES at step S109), the second-level cache device 200 deletes the data from the second-level cache device 200 (step S110), and the process control moves to step S107. When the data is not clean (NO at step S109), the second-level cache device 200 writes back the data to the second-level cache device 200 (step S111), and the process control moves to step S107.

Subsequently to step S107, the second-level cache device 200 determines whether replacement occurs in the first-level cache device 102 (step S112). When replacement does not occur in the first-level cache device 102 (NO at step S113), the second-level cache device 200 registers the data in the first-level cache device 102 and updates the first-level cache tag and the data in the first-level cache-tag copying unit 204c (step S114).

On the other hand, when replacement occurs in the first-level cache device 102 (YES at step S113), the second-level cache device 200 determines whether the first-level cache data is clean (step S115). When the first-level cache data is clean (YES at step S116), the second-level cache device 200 deletes the first-level cache data (step S117), and the process control returns to step S112. When the first-level cache data is not clean (NO at step S116), the second-level cache device 200 writes back the first-level cache data (step S118), and the process control returns to step S112.

At step S103, when the second-level cache device 200 stores the data (YES at step S103), the second-level cache device 200 determines whether the data is a synonym (step S119), and when the data is not a synonym (NO at step S120), the second-level cache device 200 proceeds to step S112.

When the data is a synonym (YES at step S120), the second-level cache device 200 determines whether the first-level cache data is shared (the data is shared by the processor cores) (step S121), and when the data is not shared (NO at step S122), proceeds to step S115.

When the first-level cache data is shared (YES at step S122), the second-level cache device 200 deletes the first-level cache data (step S123). When the deletion normally finishes (YES at step S124), the process control returns to step S112. On the other hand, when the deletion does not normally finish (NO at step S124), the second-level cache device 200 searches the first-level cache-tag copying unit 204c. When there is a hit, the second-level cache device 200 forcibly deletes the corresponding data (step S125), and the process control returns to step S112.

Thus, the second-level cache device 200 can appropriately execute the processing with respect to the read request from the processor core 100, while maintaining the coherency with the first-level cache device 102.

As described above, the second-level cache device 200 stores part of registration information of data with respect to the first-level cache device 102 (and other first-level cache devices) in the second-level cache-tag unit 204a in association with registration information in the second-level-cache data unit 204b, and stores registration information of data with respect to the first-level cache device 102 in the first-level cache-tag copying unit 204c. Based on the information in the second-level cache-tag unit 204a and the first-level cache-tag copying unit 204c, the coherency maintaining processor 203a maintains coherency between the first-level cache device 102 and the second-level cache device 200. Thus, the use efficiency of the data stored in the second-level cache-tag unit 204a can be increased, and the limited resources of the second-level cache device 200 can be effectively used.

As set forth hereinabove, according to an embodiment of the present invention, a first memory unit has a predetermined number of entries and stores part of registration information of data for the first cache memory. A second memory unit has a number of entries less than that of the first memory unit and stores remaining part of the registration information. In this manner, coherency is maintained between a first cache memory and a second cache memory. Thus, the use efficiency of data stored in the first memory unit can be increased, and the resources can be effectively used.

Moreover, upon receipt of a read request for the second cache memory, part of registration information of data corresponding to the read request is read from the first memory unit to maintain coherency between the first cache memory and the second cache memory. Thus, the two-step access is not required, which increases the machine cycle.

Further, upon receipt of a read request for the second cache memory, when corresponding data is shared by a plurality of first cache memories, coherency is maintained between the first cache memories and the second cache memory based on the remaining part of the registration information stored in the second memory unit. Thus, even when the registration information of the first level cache is divided and stored to improve the effective use of resources, coherency can be maintained appropriately between the first cache memory and the second cache memory.

Still further, when an error occurs in data stored in the first cache memory, the error is corrected based on the remaining part of the registration information stored in the second memory unit. Thus, errors in data stored in the first memory unit can be appropriately corrected.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A coherency maintaining device that maintains coherency between a first cache memory and a second cache memory that stores data in the first cache memory, the device comprising:

a first memory unit that has a predetermined number of entries and stores part of registration information of data for the first cache memory;

a second memory unit that has entries less than the entries of the first memory unit and stores remaining part of the registration information; and a coherency maintaining unit that maintains coherency between the first cache memory and the second cache memory, wherein the part of the registration information stored in the first memory unit includes share information indicating whether data corresponding to a read request received by the second cache memory is shared by a plurality of first cache memories, and upon receipt of a read request, the coherency maintaining unit acquires the share information of data corresponding to the read request and, when the data is shared, the coherency maintaining unit maintains the coherency based on the remaining part of the registration information stored in the second memory unit.

2. The coherency maintaining device according to claim 1, wherein the coherency maintaining unit simultaneously accesses the part of the registration information stored in the first memory unit and the remaining part of the registration information stored in the second memory unit based on a physical address and a logical address included in the read request.

3. The coherency maintaining device according to claim 1, wherein the part of the registration information stored in the first memory unit is a plurality of bits, and the coherency maintaining unit determines registration state of data stored in the first cache memory based on the bits to maintain coherency between the first cache memory and the second cache memory.

4. The coherency maintaining device according to claim 1, further comprising an error correction unit that, when an error occurs in data stored in the first cache memory, corrects the data having the error based on the remaining part of the registration information stored in the second memory unit.

5. The coherency maintaining device according to claim 4, wherein, when an error occurs in data stored in the first cache memory, the error correction unit determines whether to delete the data having the error based on the remaining part of the registration information stored in the second memory unit, and deletes the data having the error based on a determination result.

6. The coherency maintaining device according to claims 4, wherein the part of the registration information stored in the first memory unit is a plurality of bits, and the coherency maintaining unit determines registration state of data stored in the first cache memory based on the bits to maintain coherency between the first cache memory and the second cache memory.

7. The coherency maintaining device according to claim 1, wherein the first memory unit stores information on registration state of data for the second cache memory in association with the part of the registration information.

8. The coherency maintaining device according to claim 7, wherein the first memory unit stores information for determining whether there is a hit for a read request, information indicating whether the data stored in the first memory unit is valid, and information for determining whether the data is a synonym in association with the part of the registration information.

9. The coherency maintaining device according to claim 7, wherein the part of the registration information stored in the first memory unit is a plurality of bits, and the coherency maintaining unit determines registration state of data stored in the first cache memory based on the bits to maintain coherency between the first cache memory and the second cache memory.

10. A coherency maintaining method for maintaining coherency between a first cache memory and a second cache memory that stores data in the first cache memory, the method comprising:

storing, in a first memory unit that has a predetermined number of entries, part of registration information of data for the first cache memory; and maintaining coherency between the first cache memory and the second cache memory, wherein, the part of the registration information stored in the first memory unit includes share information indicating whether data corresponding to a read request received by the second cache memory is shared by a plurality of first cache memories, and the maintaining includes acquiring, upon receipt of a read request, the share information of data corresponding to the read request and, when the data is shared, maintaining the coherency based on the remaining part of the registration information stored in the second memory unit;

storing, in a second memory unit that has entries less than the entries of the first memory unit, remaining part of the registration information.

11. The coherency maintaining method according to claim 10, wherein the maintaining includes simultaneously accessing the part of the registration information stored in the first memory unit and the remaining part of the registration information stored in the second memory unit based on a physical address and a logical address included in the read request.

12. The coherency maintaining method according to claim 10, further comprising correcting, when an error occurs in data stored in the first cache memory, the data having the error based on the remaining part of the registration information stored in the second memory unit.

* * * * *

UNITED STATES PATENT AND TRADEMARK OFFICE
CERTIFICATE OF CORRECTION

| | |
|---|---|
| PATENT NO. | : 7,958,318 B2 |
| APPLICATION NO. | : 12/222726 |
| DATED | : June 7, 2011 |
| INVENTOR(S) | : Hideki Sakata et al. |

It is certified that error appears in the above-identified patent and that said Letters Patent is hereby corrected as shown below:

Column 15, Line 48 (Approx.), In Claim 6, delete "claims" and insert -- claim --, therefor.

Signed and Sealed this
Sixth Day of September, 2011

David J. Kappos
*Director of the United States Patent and Trademark Office*